US007688806B2

United States Patent
Shore et al.

(10) Patent No.: US 7,688,806 B2
(45) Date of Patent: Mar. 30, 2010

(54) METHOD AND SYSTEM FOR A GIGABIT ETHERNET IP TELEPHONE CHIP

(75) Inventors: Paul Shore, Whistler (CA); Balwinder Boora, Surrey (CA); Henry Li, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1007 days.

(21) Appl. No.: 11/151,138

(22) Filed: Jun. 13, 2005

(65) Prior Publication Data

US 2006/0013198 A1 Jan. 19, 2006

Related U.S. Application Data

(60) Provisional application No. 60/588,783, filed on Jul. 15, 2004.

(51) Int. Cl.
*H04L 12/66* (2006.01)
(52) U.S. Cl. .......................................... 370/352; 370/463
(58) Field of Classification Search ........................ None
See application file for complete search history.

(56) References Cited

U.S. PATENT DOCUMENTS

| 6,366,661 | B1 * | 4/2002 | Devillier et al. | ........ 379/211.01 |
| 7,075,919 | B1 * | 7/2006 | Wendt et al. | ................ 370/352 |
| 7,120,143 | B1 * | 10/2006 | Martin et al. | ................ 370/356 |
| 7,397,797 | B2 * | 7/2008 | Alfieri et al. | ................ 370/392 |
| 2002/0147814 | A1 * | 10/2002 | Kimchi et al. | .............. 709/226 |
| 2003/0091042 | A1 * | 5/2003 | Lor | ............................ 370/389 |
| 2003/0214573 | A1 | 11/2003 | Oh | |
| 2003/0236901 | A1 * | 12/2003 | Barazesh et al. | ............ 709/230 |
| 2004/0090949 | A1 | 5/2004 | So | |
| 2004/0091089 | A1 * | 5/2004 | Wynn | ...................... 379/93.05 |
| 2006/0050681 | A1 * | 3/2006 | Monteiro et al. | ............ 370/352 |
| 2006/0190627 | A1 * | 8/2006 | Wu et al. | ..................... 709/249 |

FOREIGN PATENT DOCUMENTS

| EP | 1408651 A | 4/2004 |
| WO | 01/19040 | 3/2001 |

* cited by examiner

*Primary Examiner*—Hong Cho
*Assistant Examiner*—Eunsook Choi
(74) *Attorney, Agent, or Firm*—McAndrews, Held & Malloy, Ltd.

(57) ABSTRACT

Methods and systems for processing Ethernet data are disclosed and may comprise receiving packetized data by an Ethernet switch integrated within a single gigabit Ethernet IP phone chip. A first portion of the received packetized data may be switched within the single gigabit Ethernet IP phone chip, between a first on-chip port that routes data internally for processing within the single gigabit Ethernet IP phone chip and a second on-chip port that routes data externally for off-chip processing. The packetized data may be received by a 10/100Base Ethernet physical interface transceiver (PHY) integrated within the single gigabit Ethernet IP phone chip. The packetized data may be received by a gigabit Ethernet PHY. The received packetized data may be communicated from the gigabit Ethernet PHY to the Ethernet switch integrated within the single gigabit Ethernet IP phone chip for switching.

24 Claims, 8 Drawing Sheets

METHOD AND SYSTEM FOR A GIGABIT ETHERNET IP TELEPHONE CHIP

CROSS-REFERENCE TO RELATED APPLICATIONS/INCORPORATION BY REFERENCE

This application makes reference to, claims priority to, and claims the benefit of U.S. Provisional Application Ser. No. 60/588,783 filed Jul. 15, 2004 and entitled "Method and System for a Gigabit Ethernet IP Telephone Chip."

This application makes reference to:

U.S. application Ser. No. 11/151,388 filed Jun. 13, 2005;

U.S. application Ser. No. 11/151,614 filed Jun. 13, 2005;

U.S. application Ser. No. 11/151,135 filed Jun. 13, 2005; and

U.S. application Ser. No. 11/151,139 filed Jun. 13, 2005.

The above stated applications are hereby incorporated herein by reference in their entirety.

FIELD OF THE INVENTION

Certain embodiments of the invention relate generally to IP telephones. More specifically, certain embodiments of the invention relate to a method and system for a gigabit Ethernet IP telephone chip.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer (PHY) may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network equipment capable of handling these increased data rates. In response to this demand, the physical layer, or PHY, has been designed to operate at gigabit speeds to keep pace with this demand for higher data rates. These gigabit PHYs are now becoming quite popular in home and office use.

Gigabit Ethernet, which initially found application in gigabit servers, is becoming widespread in personal computers, laptops, and switches, thereby providing the necessary infrastructure for handling data traffic of PCs and packetized telephones. However, network switches, which may be located in a central location within an office, run multiple cable mediums for network and voice data from the switch location to individual office locations, for example. In this regard, multiple cable mediums are now utilized to carry voice and network data. In the alternative, a single cable medium for voice and network data may run from the network switch to individual office locations. However, this scenario is costly as each office location will require a separate switch to route voice data to a telephone and network data to a PC.

Furthermore, existing 10/100Base Ethernet IP telephones place a bottleneck on the gigabit path between gigabit Ethernet enabled PCs and gigabit Ethernet wiring switches, since the Ethernet IP telephone is not adapted to process data utilizing gigabit speeds. Data may be communicated in gigabit speeds from a gigabit Ethernet switch to the Ethernet IP telephone, but the Ethernet IP telephone may only handle data at speeds lower than one gigabit. In this regard, existing telephones may only process gigabit Ethernet data speeds with an external gigabit Ethernet transceiver which increases connection complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a gigabit Ethernet IP telephone chip, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a gigabit Ethernet IP telephone chip. The gigabit Ethernet IP telephone chip in accordance with an embodiment of the invention eliminates the bottleneck placed by existing 10/100 Ethernet IP telephones on the gigabit path between PCs and wiring closet switches by integrating a multiport 10/100/1000 Ethernet switch in a single gigabit Ethernet IP telephone chip. By integrating a 10/100/1000 Ethernet switch within an IP Phone chip, the resulting integrated chip can support connections to a gigabit Ethernet LAN and to a gigabit Ethernet enabled PC, and may enable full wire-speed, non-blocking, traffic between the LAN and the PC. The gigabit Ethernet IP telephone chip with the integrated multiport 10/100/1000 Ethernet switch enables Ethernet IP phones to be developed, which support gigabit Ethernet local area networks (LANs). The gigabit Ethernet IP telephone chip may also comprise an embedded digital signal processor (DSP), a security module for secure voice signal communications, and a universal serial bus (USB) port interface.

Figure 1A:
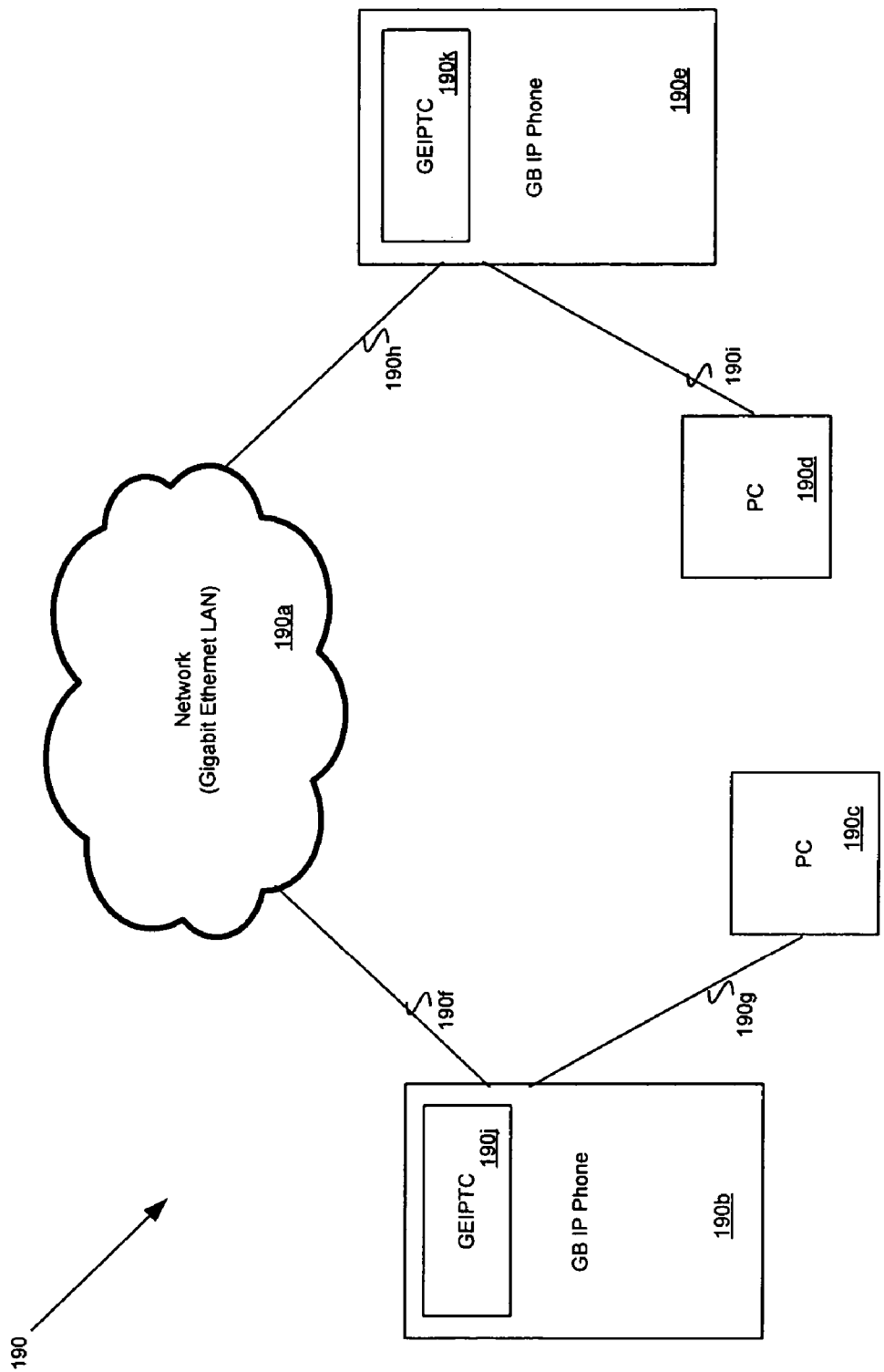
FIG. 1A is an exemplary system comprising gigabit IP telephones coupled to a network, in accordance with an embodiment of the invention.

FIG. 1A is an exemplary system comprising gigabit IP telephones coupled to a network, in accordance with an embodiment of the invention. Referring to FIG. 1A, the network telephone system 190 may comprise gigabit IP telephones 190b and 190e, personal computers (PCs) 190c and 190d, and an network 190a. The PCs 190c and 190d may be gigabit Ethernet enabled PCs. The network may comprise gigabit Ethernet local area network (LAN). The gigabit IP telephones 190b and 190e may each comprise an integrated gigabit Ethernet IP telephone chip (GEIPTC) 190j and 190k, respectively. The GEIPTC 190j and 190k may comprise suitable circuitry, logic, and/or code and may be adapted to support connection between the gigabit IP telephones 190b and 190e, the network 190a, and the PCs 190c and 190d, respectively. In this regard, a single gigabit Ethernet cable medium 190f may connect the network 190a and the gigabit IP telephone 190b and a single gigabit Ethernet medium cable 190g may connect the gigabit IP telephone 190b with the gigabit enabled PC 190c. Similarly, a single gigabit Ethernet cable medium 190h may connect the network 190a and the gigabit IP telephone 190e and a single gigabit Ethernet medium cable 190i may connect the gigabit IP telephone 190e with the gigabit enabled PC 190d.

In operation, voice data may be communicated between gigabit IP telephones 190e and 190b, via Ethernet cable mediums 190h, 190f, and the network 190a. The network 190a may also communicate network data to the gigabit Ethernet enabled PCs 190c and 190d, via Ethernet cable mediums 190f, 190g, 190h, and 190i. In this regard, Ethernet cable mediums 190f and 190h may communicate network data, originating from the network 190a, and voice data, originating from either telephone 190b or telephone 190e. After gigabit IP telephones 190b and 190e receive voice and network data via Ethernet cable mediums 190f and 190h, the GEIPTC 190j and 190k integrated within gigabit IP telephones 190b and 190h may switch the voice data for processing within the telephones 190b and 190h. Furthermore, the GEIPTC 190j and 190k may switch the network data to the PCs 190c and 190d via Ethernet cable mediums 190g and 190i, respectively.

Figure 1B:
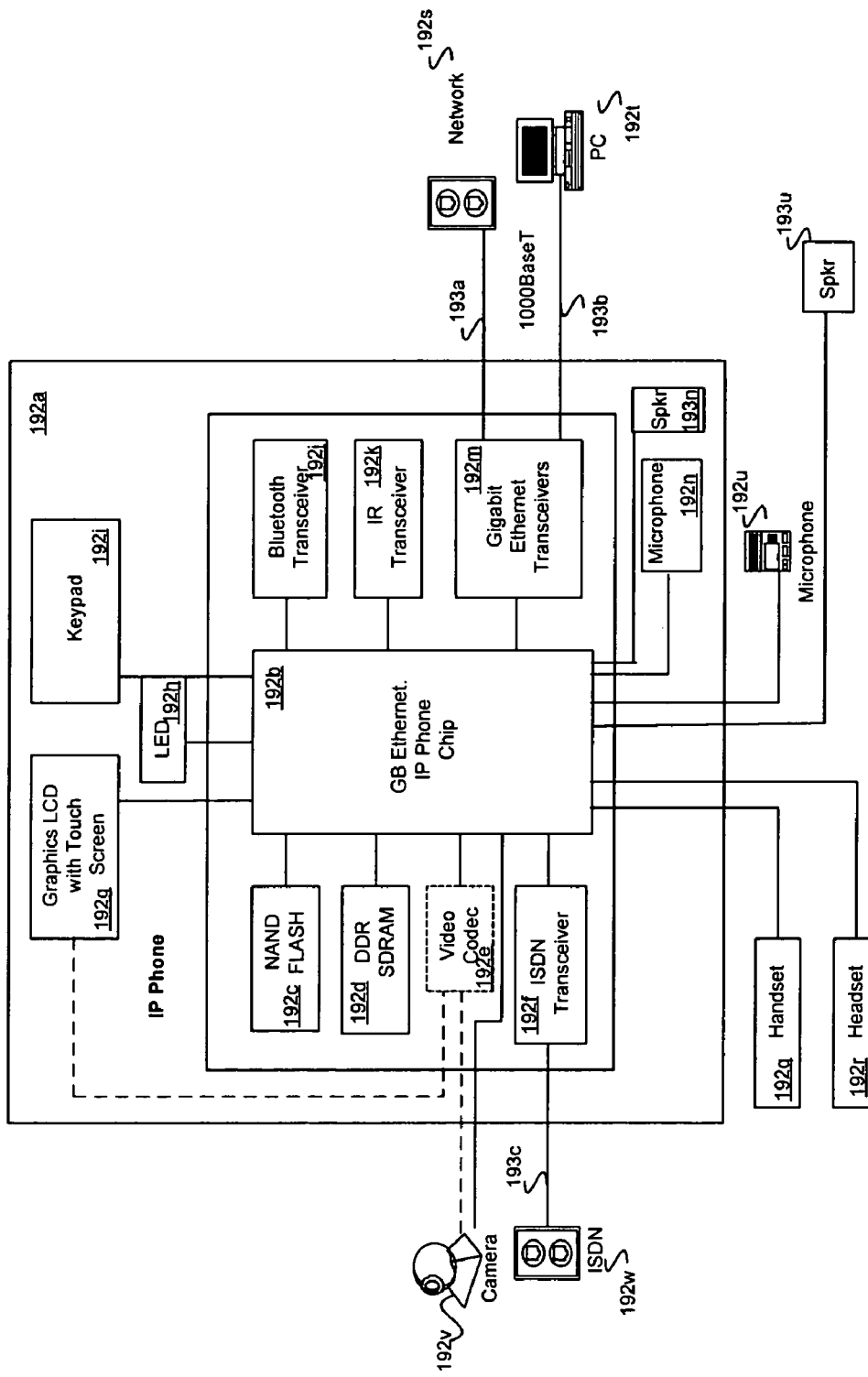
FIG. 1B is a block diagram of an exemplary gigabit Ethernet IP telephone comprising a single integrated gigabit Ethernet IP telephone chip, in accordance with an embodiment of the invention.

FIG. 1B is a block diagram of an exemplary gigabit Ethernet IP telephone comprising a single integrated gigabit Ethernet IP telephone chip, in accordance with an embodiment of the invention. Referring to FIG. 1B, the exemplary gigabit Ethernet IP telephone 192a may comprise a gigabit Ethernet IP telephone chip 192b, a LED 192h, keypad 192i, graphics LCD with touch screen capabilities 192g, NAND Flash memory 192c, double data rate synchronous dynamic random access memory (DDR SDRAM) 192d, an integrated services digital network (ISDN) transceiver 192f, internal microphone 192n, internal speaker 193n, a gigabit Ethernet transceiver (PHY) 192m, an IR transceiver 192k, and a Bluetooth® transceiver 192j. In one embodiment of the invention, the gigabit Ethernet IP telephone 192a may comprise a video codec block 192e, which may be optional.

In another embodiment of the invention, the gigabit Ethernet IP telephone chip 192b may be adapted to acquire and process voice data from one or more off-chip devices coupled to the gigabit Ethernet IP telephone 192a. For example, voice data may be communicated to the gigabit Ethernet IP telephone 192a from a network, such as a gigabit Ethernet LAN 192s via the Ethernet cable medium 193a and off-chip gigabit Ethernet transceiver (PHY) 192m, or from an ISDN 192w via cable medium 193c and an ISDN transceiver 192f. Voice data may be also communicated to the gigabit Ethernet IP telephone 192a via handset 192g, headset 192r, external speaker 193u, or internal speaker 193n.

In another embodiment of the invention, the gigabit Ethernet IP telephone chip 192b may be adapted to acquire and process network data from one or more off-chip devices coupled to the gigabit Ethernet IP telephone 192a. For example, network data may be received by the gigabit Ethernet IP telephone chip 192b from the network 192s via the Ethernet cable medium 193a and the gigabit PHY 192m. The gigabit Ethernet IP telephone chip 192b may utilize video codec 192e to decode received video data. Furthermore, video data may be communicated to the gigabit Ethernet IP telephone chip 102b for processing from an external camera 192v coupled to the video codec 192e. Processed data, which may comprise voice and/or video data, may be stored by the gigabit Ethernet IP telephone chip 192b in off-chip memory, such as NAND flash memory 192c and/or DDR SDRAM 192d. Video data may be also displayed by the LCD screen 192g. In one embodiment of the invention, the video codec 192e may be utilized for encoding as well as for providing video conferencing capabilities to the gigabit Ethernet IP telephone 192a. If the gigabit Ethernet IP telephone 192a comprises a video codec 192e, the camera 192v and the LCD 192g may be coupled to the video codec 192e. If the gigabit Ethernet IP telephone 192a does not comprises a video codec 192e, the camera 192v and the LCD 192g may be coupled to the gigabit Ethernet IP telephone chip 192b.

The gigabit Ethernet IP telephone chip 192b may comprise suitable circuitry, logic, and/or code and may be adapted to prioritize and switch voice and/or network data for processing within the gigabit Ethernet IP telephone 192a or outside the telephone 192a. For example, voice data may be communicated to the gigabit Ethernet IP telephone chip 192b from the ISDN 192w via the cable medium 193c and the off-chip ISDN transceiver 192f. Network data may be communicated to the gigabit Ethernet IP telephone chip 192b from the network 192s via the Ethernet cable medium 193b and the off-chip gigabit PHY 192m. The gigabit Ethernet IP telephone chip 192b integrated within the gigabit IP telephone 192a may then switch the voice data for processing within the telephone 192a. The network data may be switched to the PC 192t via the off-chip gigabit Ethernet PHY 192m and the Ethernet cable medium 193*b*. Other data switching scenarios for switching voice and/or network data by the gigabit Ethernet IP telephone chip 192*b* may also be possible utilizing one or more peripheral device coupled to the gigabit IP telephone 192*a*, as illustrated in FIG. 1B.

Figure 1C:
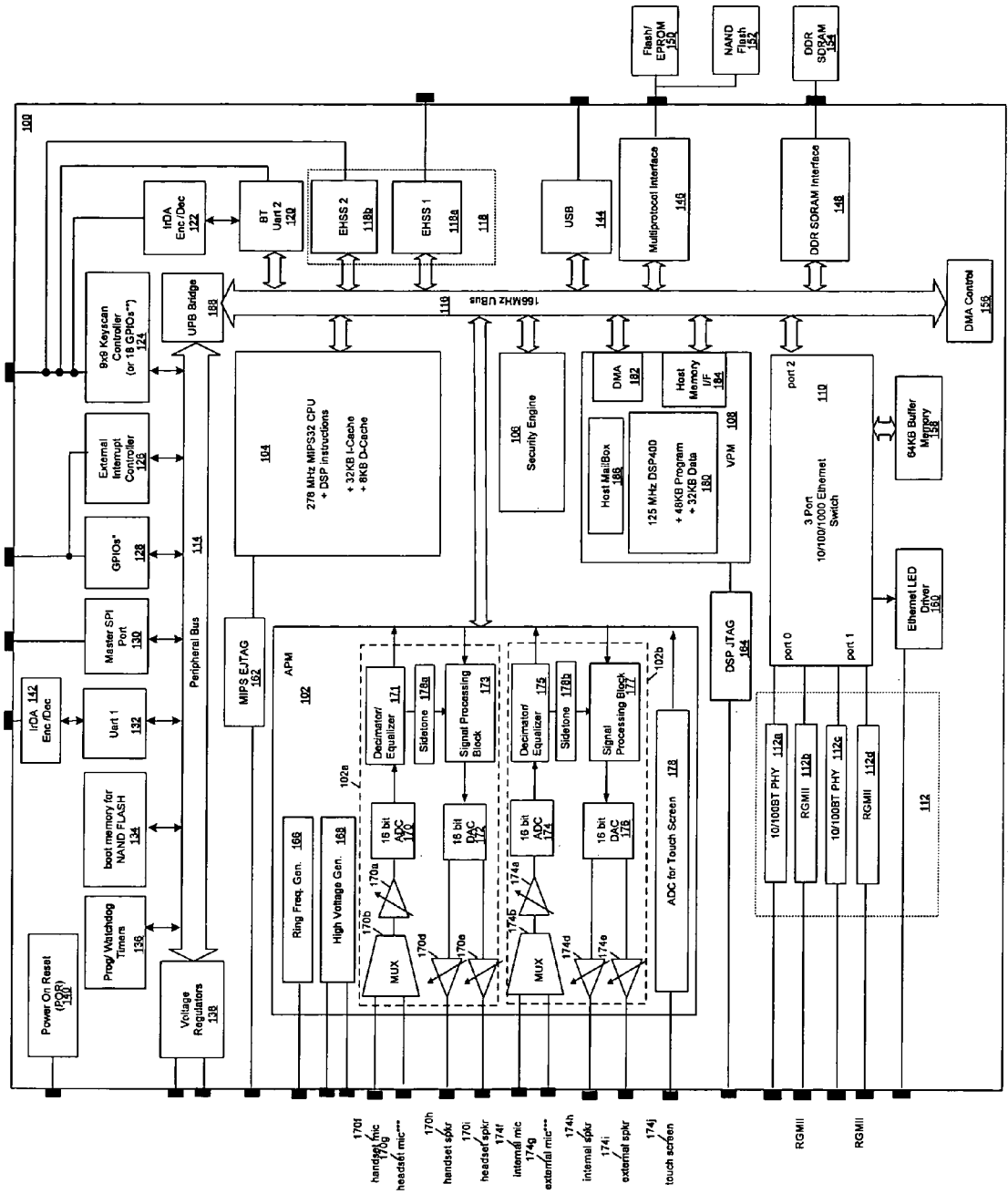
FIG. 1C is a block diagram of an exemplary system for a gigabit Ethernet IP telephone chip having an integrated Ethernet switch, in accordance with an embodiment of the invention.

FIG. 1C is a block diagram of an exemplary system for a gigabit Ethernet IP telephone chip having an integrated Ethernet switch, in accordance with an embodiment of the invention. Referring to FIG. 1C, the chip 100 may comprise a dual CODEC block 102, a core processor 104, security engine 106, voice processing module (VPM) 108, a multiport Ethernet switch 110, PHY/RGMII interfaces block 112, peripheral bus 114, system bus 116, power on reset (POR) block 140, voltage regulators block 138, DMA controller block 156, memory block 158, Ethernet LED interface 160, Joint Test Action Group (JTAG) ports 162, 164, a plurality of system interfaces, and a plurality of peripheral interfaces.

The system interfaces may comprise a Bluetooth interface 120, an Infrared Data Association (IrDA) encoder/decoder block 122, an enhanced high-speed serial (EHSS) port block 118, a universal serial bus (USB) interface block 144, multiprotocol interface block 146, and a memory interface 148. Communication with the system interfaces may occur via the system bus 116. The peripheral interfaces may comprise a keyscan controller block 124, an external interrupt controller block 126, a general purpose input/output (GPIO) block 128, a master serial peripheral interface (SPI) port block 130, a universal asynchronous receiver/transmitter (UART) block 132, an Infrared Data Association (IrDA) encoder/decoder block 142, boot memory block for NAND flash 134, and programmable/watchdog timers block 136. Communication with the peripheral interfaces may occur via the peripheral bus 114. The peripheral bus 114 and the system bus 116 may be coupled via a universal bus to peripheral bus bridge (UPB) 188.

The dual CODEC block 102, the core processor 104, the security engine 106, the voice processing module (VPM) 108, the multiport Ethernet switch 110, the DMA controller block 156, the Bluetooth interface 120, the enhanced high-speed serial (EHSS) port block 118, the universal serial bus (USB) interface block 144, the multiprotocol interface block 146, and the DDR SDRAM memory interface 148 may be coupled via the system bus 116. The keyscan controller block 124, the external interrupt controller block 126, the general purpose input/output (GPIO) block 128, the master serial peripheral interface (SPI) port block 130, the universal asynchronous receiver/transmitter (UART) block 132, the Infrared Data Association (IrDA) encoder/decoder block 142, the boot memory block for NAND flash 134, and the programmable/watchdog timers block 136 may be coupled via the peripheral bus 114. Furthermore, the PHY/RGMII interfaces block 112, the memory block 158, and the Ethernet LED interface 160 may be coupled to the multiport Ethernet switch 110.

The dual CODEC block 102 comprises suitable coder/decoder (CODEC) logic, circuitry and/or code that may be adapted to handle compression/decompression of audio signals, such as conversion between analog signals and digital samples at various sample rates. For example, the dual CODEC block 102 may comprise a ring frequency generator block 166, a high voltage generator block 168, CODEC blocks 102*a* and 102*b*. The CODEC block 102*a* may comprise a decimator/equalizer block 171, a sidetone generator block 178*a*, a signal processing block 173, an interpolating CIC filter 173, an ADC block 170, a digital-to-analog converter (DAC) block 172, a multiplexer 170*b*, and gain controllers (amplifiers) 170*a*, 170*d* and 170*e*. Similarly, the CODEC block 102*b* may comprise a decimator/equalizer block 175, a sidetone generator block 178*b*, a signal processing block 177, an ADC block 174, a digital-to-analog converter (DAC) block 176, a multiplexer 174*b*, and gain controllers (amplifiers) 174*a*, 174*d* and 174*e*. The decimator/equalizer blocks 171 and 173 may comprise one or more decimating cascaded integrator comb (CIC) filters and/or one or more equalizers. The CIC filters may be adapted to perform resampling from 12.5 MHz, for example, which may be the raw sampling rate of the ADCs 170 and 174 and the DACs 172 and 176.

Also integrated within chip 100 is an ADC 178 that may be adapted to handle touch screen capability. Although the ADC 178 is illustrated as being internal to the dual CODEC block 102, the invention is not so limited. Accordingly, in another embodiment of the invention, the ADC 178 may be located externally to the dual CODEC block 102. The sidetone generator blocks 178*a* and 178*b* may comprise one or more Y-filters and may allow sidetone to be added to a receive path of an audio signal.

The CODEC block 102*a* may be adapted to support a plurality of input and a plurality of output audio sources by way of multiplexing. For example, audio input from a handset microphone 170*f* and a headset microphone 170*g* may be multiplexed by the multiplexer 170*b* and may be utilized as audio inputs to the CODEC block 102*a*. Audio output signals from the CODEC block 102*a* may be amplified by amplifiers 170*d* and 170*e* before being communicated to a handset speaker 170*h* and a headset speaker 170*i*, respectively.

Similarly, the CODEC block 102*b* may be adapted to support a plurality of input and a plurality of output audio sources by way of multiplexing. For example, audio input from an internal microphone 174*f* and an external microphone 174*g* may be multiplexed by the multiplexer 174*b* and may be utilized as audio inputs to the CODEC block 102*b*. Audio output signals from the CODEC block 102*b* may be amplified by amplifiers 174*d* and 174*e* before being communicated to an internal speaker 174*h* and an external speaker 174*i*, respectively. The ADC 178 may be adapted to convert analog signals received from the touch screen enabled monitor 174*j*.

The ring frequency generator 166 may comprise suitable circuitry, logic, and/or code and may be adapted to generate a ringing reference waveform. The generated ringing reference waveform may be utilized by one or more serial link and interrupt controllers (SLICs), integrated within the gigabit Ethernet IP telephone chip 100, to drive their high voltage ringing circuitry. The waveform generated by the ring frequency generator 166 may be configurable between sinusoids, trapezoids, and square waves. Frequency, amplitude, and DC offset may also be configurable. In one embodiment of the invention, the ring frequency generator 166 may comprise power down control circuitry.

The high voltage generator 168 may comprise suitable circuitry, logic, and/or code and may be adapted to generate voltages required by an external SLIC, for example, for ringing and battery feed. In one aspect of the invention, the high voltage generator 168 may be adapted to generate a plurality of negative supply voltages, such as −70 and −21 V nominally, which may be required for SLIC operation.

The core processor 104 may be, for example, a reduced instruction set computer (RISC) processor, such as a million-instructions-per-second (MIPS) processor. The core processor 104 may also comprise suitable logic, circuitry and/or code that may be adapted to handle digital signal processing (DSP) instructions. In an embodiment of the invention, the ability to handle DSP instructions by the core processor 104 may be enabled or disabled. Accordingly, the core processor 104 may be operated with the DSP instruction capability disabled. In one aspect of the invention, the ability to handle DSP instructions by the core processor 104 may be disabled when the voice processing module 108 is utilized. A Joint Test Action Group (JTAG) emulator (EJTAG) port 162 may be coupled to the processor core 162 and may be utilized for debugging. The core processor 104 may be a RISC processor that may be utilized to run operating system code and customer application code, for example. Customer application code may include messaging code, call processing code and web browser code, for example.

The security engine 106 may comprise suitable logic, circuitry, and/or code that may be adapted to handle security functions, such as encryption, decryption and/or authentication. The security engine 106 may comprise a hardware based security module (HSM), not shown in FIG. 1C, which may provide a hardware-ensured secure way to digitally identify a device based on cryptographic algorithms. Secure digital identification within the HSM may be achieved by, for example, embedding the identity or private key information in protected on-chip one-time programmable (OTP) ROM. Private key information may then be used to secure voice and/or data traffic within the gigabit Ethernet IP telephone chip 100. The HSM may also comprise assurance logic, which may be utilized to prevent device tampering and unwanted access to secure information in ROM. A gigabit Ethernet IP telephone chip with integrated security module is described in U.S. application Ser. No. 11/151,614 filed Jun. 13, 2005, which is incorporated herein by reference in its entirety.

The voice processing module (VPM) 108 may comprise digital signal processor (DSP) block 180, a host mailbox block 186, a direct memory access (DMA) block 182, and a host memory interface block 184. The DSP block 180 may comprise memory that may be adapted to handle storage of data and storage of program code. A JTAG port 164 coupled to the VPM 108 may be utilized for debugging. The DSP block 180 may be adapted to run voice processing application code and CODEC algorithms for one or more of a plurality of protocols or standards.

The VPM 108 may be adapted to perform voice related signal processing functions within the gigabit Ethernet IP telephone chip 100. The DMA block 182 may be utilized to transport CODEC data and/or program code between internal memory of the VPM 108 and external memory, such as dynamic random access Memory (DRAM) for example, for processing. In one embodiment of the invention, the DMA block 182 may comprise a dual channel DMA engine. Voice data may be also stored in off-chip memory, such as DDR-SDRAM 154 via the DDR-SDRAM interface 148.

The host mailbox block 186 may comprise a set of mailbox registers, which may be utilized to provide communication between the core processor 104 and the DSP block 180. For example, the mailbox registers of the host mailbox block 186 may utilize an interrupt mechanism between the core processor 104 and the DSP block 180, for handling the processing of more data. The host memory interface 184 may be utilized by the DSP block 180 to directly access messages residing in external DRAM, for example.

The PHY/RGMII interfaces block 112 may comprise reduced gigabit media independent interfaces (RGMII) 112b and 112d, and 10/100Base Ethernet physical interface transceivers (PHY) 112a and 112c. The RGMII 112b and 112d may comprise suitable circuitry, logic, and/or code and may be adapted to provide an interface between a gigabit media independent interface (GMII) of the multiport Ethernet switch 110 and an external Ethernet PHY. In one embodiment of the invention, the gigabit Ethernet IP telephone chip may utilize a gigabit PHY for receiving and transmitting of packetized data. The gigabit PHY may be implemented off-chip or may be integrated within the gigabit Ethernet IP telephone chip 100. In this regard, the RGMII 112b and 112d may provide an interface between a gigabit media independent interface (GMII) of the multiport Ethernet switch 110 and an external gigabit PHY.

The 10/100Base PHYs 112a and 112c may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within the gigabit Ethernet IP telephone chip 100. For example, the 10/100Base PHYs 112a and 112c may support 4B5B, MLT3, and Manchester encoding and decoding, clock and data recovery, stream cipher scrambling/descrambling. The 10/100Base PHYs 112a and 112c may also support digital adaptive equalization, line transmission, carrier sense and link integrity monitor, auto-negotiation, and management.

The multiport Ethernet switch 110 may comprise suitable circuitry, logic, and/or code and may be adapted to switch between one or more ports that route data internally within the gigabit Ethernet IP telephone chip 100 for processing and one or more other ports that route data for off-chip processing. For example, as illustrated in FIG. 1C, the multiport Ethernet switch 110, which may be a 10/100/1000 Ethernet switch, may comprise a plurality of ports, port 0 and port 1, for receiving and transmitting network and/or voice data off-chip via the PHY/RGMII interfaces block 112. The multiport Ethernet switch 110 may also comprise port 2 for routing voice and/or network data internally for processing within the gigabit Ethernet IP telephone chip 100. Port 0 may be coupled to the 10/100Base PHY 112a and RGMII interface 112b. Port 1 may be coupled to a 10/100Base PHY 112c and RGMII interface 112d. Port 2 may be coupled to the system bus 116.

The multiport Ethernet switch 110 may utilize memory 158 and an Ethernet LED interface 160. The Ethernet LED interface 160 may comprise suitable circuitry, logic, and/or code and may be utilized to provide visibility of link status, combined transmit and receive activity, duplex mode, and/or port speed for each port within the multiport Ethernet switch 110. The Ethernet LED interface 160 may also provide an indication of the load and/or status of the multiport Ethernet switch 110.

The keyscan controller block 124 may comprise suitable logic, circuitry and/or code that may be adapted to determine when a key is pressed and to identify what key or keys are depressed. In one aspect of the invention, the input and output pins of the keyscan controller block 124 may be configured as general purpose input/output (GPIO) pins. The power on reset (POR) block 140 may comprise suitable logic and/or circuitry that may be adapted to handle power up and reset scenarios. The voltage regulators block 138 may comprise suitable logic and/or circuitry that may be adapted to handle voltage/current regulation within the gigabit Ethernet IP telephone chip 100.

The multiprotocol peripheral interface (MPI) block 146 may comprise suitable logic, circuitry and/or code that may be adapted to handle a plurality of different types of memory. As illustrated in FIG. 1C, flash/EPROM block 150 and NAND flash block 152 may be coupled to the multiprotocol interface block 146. The MPI block 146 may also support other types of memory, such as NOR flash memory, as well as PCI, Mini PCI, CardBus, PCMCIA and expansion bus interface (EBI) devices. In this regard, the gigabit Ethernet IP telephone chip 100 may be adapted to support high-speed peripherals, including wireless network adaptors and/or video processors, for example.

The memory interface 148 may be, for example, a double data rate (DDR) SDRAM interface block. As illustrated in FIG. 1C, a DDR SDRAM block 154 may be externally coupled to the DDR SDRAM interface block 148. The memory interface 148 may be utilized to speedily move data on-chip and off-chip for processing. The DMA controller block 156 may be utilized to facilitate DMA transfers between the external SDRAM 154 and EBI devices coupled to the gigabit Ethernet IP telephone chip 100.

The universal serial bus (USB) interface block 144 may comprise a USB compliant serial bus, which may be, for example, USB1.1, USB2.0, or other USB compliant interface.

The external interrupt controller block 126 may comprise suitable logic, circuitry, and/or code and may be adapted to handle external interrupts. For example, one or more external events may cause the external interrupt controller 126 to generate an interrupt to the core processor 104.

The GPIO block 128 may comprise a plurality of general-purpose I/O interface pins that may be programmed as input and/or output pins of the gigabit Ethernet IP telephone chip 100. One or more registers within the gigabit Ethernet IP telephone chip 100 may be utilized to program the general-purpose I/O interface pins in the GPIO block 128. The GPIO block 128 may also comprise a LED matrix block, which may be utilized to indicate a status of the GPIO interface pins.

The master SPI port block 130 is a standardized serial peripheral interface (SPI) port and may be utilized for communication with the serial programming interfaces of various devices coupled to the gigabit Ethernet IP telephone chip 100.

The universal asynchronous receiver/transmitter (UART) block 132 may comprise a standard UART port which may be utilized as a debug port. The UART block 132 may be coupled to an Infrared Data Association (IrDA) encoder/decoder block 142 which may support serial infrared (SIR) mode of infrared communication. In this regard, the IrDA encoder/decoder block 142 may support an infrared communication portal between a PC and PDAs or cellular phones utilizing the gigabit Ethernet IP telephone chip 100.

The boot memory block for NAND flash 134 may be adapted to store boot code that controls initialization and setup of the gigabit Ethernet IP telephone chip 100. Other code or parameters may also be stored in the boot memory block for NAND flash 134.

The programmable/watchdog timers block 136 may comprise a plurality of timers such as a watchdog timer. In this regard, a watchdog timer may be included to generate a chip reset if the gigabit Ethernet IP telephone chip 100 is not periodically reset. An interrupt, for example, may be generated after one-half the watchdog count to remind the host to reset the timer.

The Bluetooth interface 120 is Bluetooth compliant and may be coupled to the IrDA encoder/decoder (ENC/DEC) interface block 122. The Bluetooth interface 120 may comprise an UART which may be adapted to support external Bluetooth modules. The Infrared Data Association (IrDA) encoder/decoder block 122 may support serial infrared (SIR) mode of infrared communication.

The enhanced high speed serial (EHSS) port block 118 comprises at least one EHSS interface that is configured to handle serial data. As illustrated in FIG. 1C, the EHSS block 118 may comprise a first EHSS 118a and a second EHSS interface 118b. The EHSS 118a and 118b may provide time division multiplexing (TDM) interface for connecting the gigabit Ethernet IP telephone chip 100 with external CODECs or any external device with a synchronous interface.

The UPB bridge block 188 may comprise suitable circuitry, logic, and/or code and may be adapted to bridge the peripheral bus 114 and the system bus 116. Accordingly, the UPB bridge facilitates communication between devices coupled to the system bus 116 and peripheral devices coupled to the peripheral bus 114.

During an exemplary voice data transmission operating cycle, voice data may be acquired via the microphone ports 170f, 170g, 174f, and 174g of CODEC blocks 102a and 102b within the dual CODEC block 102. Voice data may be initially amplified by the on-board amplifiers 170a and 174a, and then digitized by the ADC blocks 170 and 174 at a high sampling rate, such as 12.5 MHz, for example. The oversampled voice data may be decimated by the CIC (Cascaded-Integrated-Comb) filters within the decimator/equalizer blocks 171 and 175, which may resample the data to an intermediate sampling rate of 100 kHz, for example.

A gain or attenuation may be applied to the resulting 100 kHz sampled signal. The gain-adjusted 100 kHz samples may be further downsampled by an asynchronous sample rate converter (ASRC), not shown in FIG. 1C, to a rate (voiceband) suitable for software digital signal processing, such as 16 kHz. The voiceband samples may be filtered by a programmable equalizer within the decimator/equalizer blocks 171 and 175, which may equalize the transducer response in order to meet telecom specifications. The voice data output of the decimator/equalizer blocks 171 and 175 may be stored in the external SDRAM 154 via the system bus 116 and a DMA control block within the dual CODEC block 102.

The stored voice data may then be communicated to the VPM block 108 for processing. For example, the equalized voice data may be processed by the DSP 180 using voice processing software stack. The software stack within the DSP 180 may perform VoIP processing, such as acoustic echo cancellation, handset echo cancellation, conference bridging, tone generation, comfort noise generation, and/or voice compression. In one embodiment of the invention, the gigabit Ethernet IP telephone chip 100 may utilize the core processor 104 to perform DSP processing functions. In this regard, equalized voice data may be communicated to the core processor 104 for DSP processing.

After equalized voice data is processed by the VPM 108, compressed speech frames may be packetized by the core processor 104. If security is required, packetized voice data may be communicated to the security module 106 for encryption. During encryption, voice data may be communicated from the VPM 108 to the security module 106 via the external SDRAM 154. After encryption, encrypted data packets may be further encapsulated by the core processor 104 with headers suitable for transmission over an IP network.

Encrypted packetized voice data may then be communicated to the multiport Ethernet switch 110 via direct memory access using the external SDRAM 154 and the DMA control block within the Ethernet switch 110. The multiport Ethernet switch 110 may then route the packetized voice data to a network port, such as port 1, for example. The packetized voice data may be converted into signals suitable for transmission over an Ethernet cable medium using the internal 10/100Base Ethernet PHY 112c or a gigabit Ethernet PHY, not illustrated in FIG. 1C, coupled to the RGMII interface 112d. A gigabit Ethernet PHY may be located, for example, off-chip. The 10/100Base PHY or the gigabit PHY may then transmit the packetized voice data via an Ethernet network.

During an exemplary voice data reception operating cycle, packetized voice data may be received by the multiport Ethernet switch 110 via an Ethernet cable medium using the internal 10/100Base Ethernet PHY 112c or a gigabit Ethernet PHY coupled to the RGMII interface 112d of port 1 of the multiport Ethernet switch 110. The multiport Ethernet switch 110 may then route the packetized voice data internally for processing within the gigabit Ethernet IP telephone chip 100 via port 2. For example, the packetized voice data may be stored in the external DDR SDRAM 154 via the system bus 116 and the DMA control block within the Ethernet switch 110.

The stored packetized voice data may then be communicated to the security module 106 for decryption. Decrypted packetized data may be depacketized by the core processor 104. Depacketized and decrypted voice data may be communicated to the VPM 108 for processing. The VPM 108 may decompress the voice data and may communicate the decompressed voice data to the dual CODEC block 102. The decompressed data may be filtered by the CIC filter 173 or 177 within the CODEC blocks 102a or 102b. Filtered voice data may be converted to an analog signal by the DAC converters 172 or 176, amplified by the amplifiers 170d, 170e, 174d, and 174e, and communicated to one or more of the audio signal outputs 170h, 170i, 174h, and 174i.

During an exemplary network data transmission operating cycle, network data, such as Ethernet data from a PC, may be received by the multiport Ethernet switch 110 via an Ethernet cable medium using the internal 10/100Base Ethernet PHY 112a or a gigabit Ethernet PHY coupled to the RGMII interface 112b of port 0 of the multiport Ethernet switch 110. In one embodiment of the invention, one of the ports of the multiport Ethernet switch 110, such as port 0, may be designated as a PC port and may be utilized during reception and transmission of PC Ethernet data. The 10/100Base Ethernet PHY 112a or the gigabit PHY may convert the PC Ethernet data from analog to digital format. The multiport Ethernet switch 110 may then route the resulting IP packets to a second port, such as port 1, for communicating the packetized PC Ethernet data off-chip. For example, the multiport Ethernet switch 110 may then route the resulting IP packets to the internal 10/100Base PHY 112c of port 1 or to an external gigabit PHY via the RGMII interface 112d. The 10/100Base PHY 112c or the gigabit PHY may convert the packetized PC Ethernet data into signals suitable for transmission over Ethernet cable medium. In this regard, the signal may flow through the Ethernet cable medium and into an IP network.

During an exemplary network data reception operating cycle, network data, such as Ethernet data for a PC, may be received by the multiport Ethernet switch 110 via an Ethernet cable medium using the internal 10/100Base Ethernet PHY 112c or a gigabit Ethernet PHY coupled to the RGMII interface 112d of port 1 of the multiport Ethernet switch 110. In one embodiment of the invention, one of the ports of the multiport Ethernet switch 110, such as port 0, may be designated as a PC port and may be utilized during reception and transmission of PC Ethernet data. A second port, such as port 1, may be designated as a network port and may be utilized during reception and transmission of packetized data, including voice and network data, from and to an IP network. The 10/100Base Ethernet PHY 112d or the gigabit PHY may convert the network data from analog to digital format. The multiport Ethernet switch 110 may then route the resulting IP packets to a second PC data port, such as port 0, for communicating the packetized network data off-chip to a PC. For example, the multiport Ethernet switch 110 may route the resulting IP packets to the internal 10/100Base PHY 112a of port 0 or to an external gigabit PHY via the RGMII interface 112b. The 10/100Base PHY 112a or the gigabit PHY may convert the packetized PC Ethernet data into signals suitable for transmission over Ethernet cable medium. In this regard, the signal may flow through the Ethernet cable medium and off-chip to a PC for processing.

Figure 2:
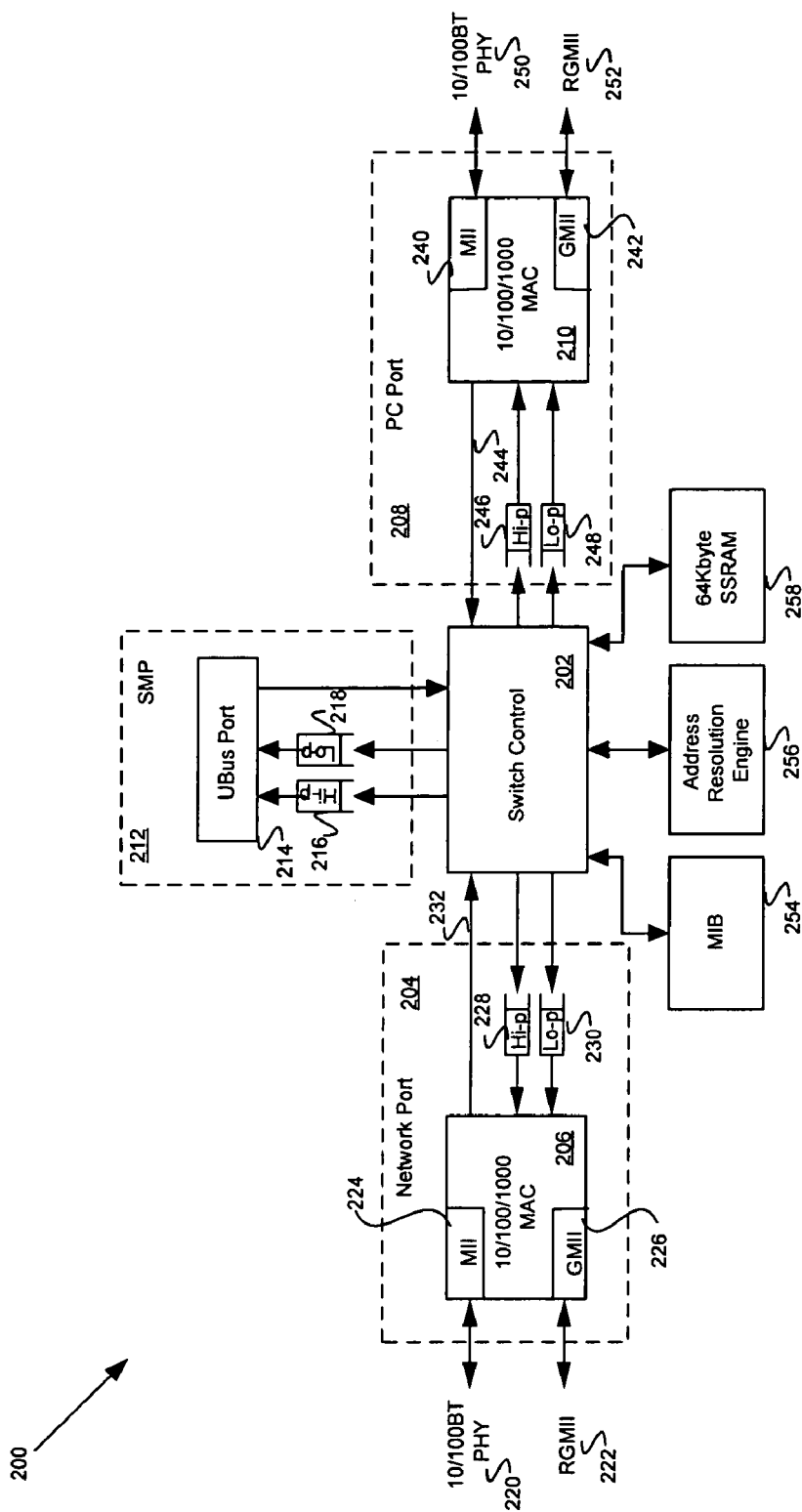
FIG. 2 is a block diagram of an Ethernet switch that may be integrated within a gigabit Ethernet IP telephone chip, in accordance with an embodiment of the invention.

FIG. 2 is a block diagram of an Ethernet switch that may be integrated within a gigabit Ethernet IP telephone chip, in accordance with an embodiment of the invention. Referring to FIG. 2, the Ethernet switch 200 may comprise a switch management port (SMP) 212, a network port 204, a PC port 208, switch control block 202, 10/100Base PHYs 220 and 250, RGMII interfaces 222 and 252, management information base (MIB) statistics registers 254, address resolution engine 256, and memory 258. Although RGMII interfaces are used within the Ethernet switch 200, other types of interfaces, such as gigabit media independent interface (GMII) or serial gigabit media independent interface (SGMII), may also be utilized within the Ethernet switch 200.

The network port 204 may comprise suitable circuitry, logic, and/or code and may be adapted to route received packetized data, such as network (PC) data or voice data, to the switch control block 202, and route voice or PC data from the switch control block 202 off-chip to an IP network. The network port 204 may comprise 10/100/1000 media access controller (MAC) 206, a high priority buffer 228 and a low priority buffer 230.

The MAC 206 may comprise suitable circuitry, logic, and/or code and may be adapted to control data flow between the 10/100Base PHY 220 and a gigabit PHY via the RGMII interface 222. In one embodiment of the invention, the MAC 206 may be enabled with triple speed capabilities, as well as half- and full-duplex capabilities. The MAC 206 may provide data flow control in half-duplex mode with backpressure. In full-duplex mode, the MAC 206 may provide IEEE 802.3x frame-based flow control. The MAC 206 may be IEEE 802.3 compliant and may support a frame size of 1536 bytes. The MII 224 may comprise suitable circuitry, logic, and/or code and may be utilized as an interface between the MAC 206 and the 10/100Base PHY 220. The GMII 226 may comprise suitable circuitry, logic, and/or code and may be utilized as an interface between the MAC 206 and the RGMII 222 and a gigabit PHY which may be coupled to the RGMII 222.

The PC port 208 may comprise suitable circuitry, logic, and/or code and may be adapted to route received network or PC data to the switch control block 202, and route PC data from the switch control block 202 off-chip to a PC. The PC port 208 may comprise 10/100/1000 media access controller (MAC) 210, a high priority buffer 246 and a low priority buffer 248.

The MAC 210 may comprise suitable circuitry, logic, and/or code and may be adapted to control PC data flow between the 10/100Base PHY 250 and a gigabit PHY via the RGMII interface 252. Similar to MAC 206, MAC 210 may also be enabled with triple speed capabilities, as well as half- and full-duplex capabilities. The MAC 210 may also provide data flow control in half-duplex mode with backpressure. In full-duplex mode, the MAC 210 may provide IEEE 802.3x frame-based flow control. The MAC 210 may be IEEE 802.3 compliant and may support a frame size of 1536 bytes. The MII 240 may comprise suitable circuitry, logic, and/or code and may be utilized as an interface between the MAC 210 and the 10/100Base PHY 250. The GMII 242 may comprise suitable circuitry, logic, and/or code and may be utilized as an interface between the MAC 210 and the RGMII 252 and a gigabit PHY which may be coupled to the RGMII 252.

The SMP 212 may comprise suitable circuitry, logic, and/or code and may be adapted to communicate via the universal bus port 214 packetized data, such as voice data, for on-chip processing by a gigabit Ethernet IP telephone chip, for example, which may be using the multiport Ethernet switch 200. Processed voice data may be communicated via the universal bus port 214 within the SMP 212 to the switch control block 202 for routing off-chip via the network port 204, for example.

The RGMIIs 222 and 252 may comprise suitable circuitry, logic, and/or code and may be adapted to provide an interface between gigabit media independent interfaces (GMIIs) 226 and 242 of the network port 204 and the PC port 208, respectively, and external Ethernet PHYs. In one embodiment of the invention, the multiport Ethernet switch 200 may utilize gigabit PHYs for receiving and transmitting of packetized data. The gigabit PHYs may be implemented off-chip or may be integrated within a gigabit Ethernet IP telephone chip, such as the gigabit Ethernet IP telephone chip 100 in FIG. 1C. In this regard, the RGMIIs 222 and 252 may provide an interface between GMIIs 226 and 242 of the multiport Ethernet switch 200 and external gigabit PHYs.

The 10/100Base PHYs 220 and 250 may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within a gigabit Ethernet IP telephone chip utilizing the multiport Ethernet switch 200. For example, the 10/100Base PHYs 220 and 250 may support 4B5B, MLT3, and Manchester encoding and decoding, clock and data recovery, and stream cipher scrambling/descrambling, for example. The 10/100Base PHYs 220 and 250 may also support digital adaptive equalization, line transmission, carrier sense and link integrity monitor, auto-negotiation, and management.

The switch control block 202 may comprise suitable circuitry, logic, and/or code and may be adapted to route packetized data for on-chip or off-chip processing via one or more of the ports 204, 208, and 212. For example, voice and PC data may be received via the network port 204. The received voice data may then be routed for on-chip processing within a gigabit Ethernet IP telephone chip, for example, via the SMP 212. Received PC data may be routed by the switch control block 202 for off-chip processing by a PC via the PC port 208. Voice data processed by the gigabit Ethernet IP telephone chip may be routed by the switch control block 202 from the SMP 212 to the network port 204 where it may be communicated off-chip. Similarly, processed PC data may be routed by the switch control block 202 from the PC port 208 to the network port 204 where it may be communicated off-chip.

In one embodiment of the invention, the multiport Ethernet switch 200 may be adapted to support IEEE 802.1p Quality of Service (QoS) protocol. In this regard, the multiport Ethernet switch 200 may utilize tagging at the network port 204 and the PC port 208 with priority regeneration mapping. Furthermore, the multiport Ethernet switch 200 may maintain two output port queues for each port. For example, high priority buffers 228, 216, and 246 may be utilized within the network port 204, the SMP 212, and the PC port 208, respectively, to buffer high priority output data. Similarly, low priority buffers 230, 218, and 248 may be utilized within the network port 204, the SMP 212, and the PC port 208, respectively, to buffer low priority output data. In this regard, traffic priority within the multiport Ethernet switch 200 may be mapped onto one of two traffic classes, 0 or 1, for example. Outgoing traffic class 1 packets may be enqueued onto the high priority queues 228, 216, and 246. The high priority buffers 228, 216, and 246 may be adapted to accommodate 2 packets, for example, and overflow packets from the high priority buffers 228, 216, and 246 may be discarded. In another aspect of the invention, the high priority queue depth may be programmable and any overflow packets may be enqueued onto the low priority buffers 230, 218, and 248.

In another embodiment of the invention, each of the high priority buffers 228, 216, and 246 and the low priority buffers 230, 218, and 248 may be utilized to buffer voice and/or PC data. In this regard, both voice and PC data may be prioritized prior to communicating the data for on-chip or off-chip processing. A gigabit Ethernet IP telephone chip with 802.1x QoS is described in U.S. application Ser. No. 11/151,135 filed Jun. 13, 2005, which is incorporated herein by reference in its entirety.

The multiport Ethernet switch 200 may also support source MAC address filtering for the PC port 208, port mirroring, port isolation, multi-port forwarding, and status change interrupt. In addition, the multiport Ethernet switch 200 may support LED interface, which may provide visibility per port of link status, combined transmit and receive activity, duplex mode, and port speed.

The address resolution engine 256 may comprise suitable circuitry, logic, and/or code and may be adapted to provide address learning and recognition functions to the switch control block 202 at high frame rates. The address resolution engine 256 may utilize an address table, which may hold 1K unicast addresses, for example. Addresses may be added to the table after receiving a data packet. In this regard, broadcast and multicast frames may be forwarded to one or more ports, except the port where it was received.

The MIB statistics registers 254 may comprise suitable circuitry, logic, and/or code and may be utilized to collect, receive and transmit statistics for each port. In addition, the MIB registers 254 may be utilized to provide direct hardware support for EtherLike MIB, Bridge MIB, MIB II (Interfaces), and the first four groups of the remote network monitoring (RMON) MIB. At least a portion of the standardized RMON groups may be supported by using additional capabilities, such as port mirroring/snooping, together with an external microcontroller to process some MIB attributes. The MIB registers 254 may be accessed through a Serial Management Port, for example, by an external microcontroller or processor.

During an exemplary voice data transmission operating cycle encrypted packetized voice data may be received by the SMP 212 via the universal bus port 214 and may be communicated to the switch control block 202 for routing. The switch control block 202 may then route the packetized voice data to the network port 204. For example, the packetized voice data may be prioritized and high priority data may buffered by the high priority buffer 228 and low priority data may be buffered by the low priority buffer 230. Packetized voice data from both buffers 228 and 230 may be communicated to the MAC 206. The MAC 206 may communicate the voice data to the 10/100Base Ethernet PHY 220 or to the RGMII interface 222 for communication to a gigabit Ethernet PHY. In this regard, the voice data may be converted into signal suitable for transmission over an Ethernet cable medium using the internal 10/100Base Ethernet PHY 220 or a gigabit Ethernet PHY, not illustrated in FIG. 2, coupled to the RGMII interface 222. A gigabit Ethernet PHY may be located, for example, off-chip. The 10/100Base PHY 220 or the gigabit PHY may then transmit the packetized voice data via an Ethernet network.

During an exemplary voice data reception operating cycle, packetized voice data may be received by the multiport Ethernet switch 200 via an Ethernet cable medium using the internal 10/100Base Ethernet PHY 220. Packetized voice data may also be received by the multiport Ethernet switch 200 via a gigabit Ethernet PHY coupled to the RGMII interface 222 of the network port 204 of the multiport Ethernet switch 200. The received voice data may then be communicated to the MAC 206 and, via connection 232, to the switch control block 202. The switch control block 202 may route the received voice data to the SMP 212. For example, received voice data may be prioritized and high priority data may be buffered by the high priority buffer 216 and low priority data may be buffered by the low priority buffer 218. The multiport Ethernet switch 200 may then route the packetized voice data internally for processing within the gigabit Ethernet IP telephone chip via the universal bus port 212.

During an exemplary network or PC data transmission operating cycle, PC data may be communicated from a PC and may be received by the multiport Ethernet switch 200. PC data may be received via an Ethernet cable medium using the internal 10/100Base Ethernet PHY 250 or a gigabit Ethernet PHY coupled to the RGMII interface 252 of the PC port 208. The received PC data may then be communicated to the MAC 210 and, via connection 246, to the switch control block 202. The switch control block 202 may route the received PC data to the network port 204 for communicating the PC data off-chip. Received PC data may be prioritized and high priority data may buffered by the high priority buffer 228 and low priority data may be buffered by the low priority buffer 230. The multiport Ethernet switch 200 may then route the packetized voice data internally for processing within the gigabit Ethernet IP telephone chip via the universal bus port 212.

During an exemplary network or PC data reception operating cycle, PC data may be communicated from an IP network and may be received by the multiport Ethernet switch 200. PC data may be received via an Ethernet cable medium using the internal 10/100Base Ethernet PHY 220 or a gigabit Ethernet PHY coupled to the RGMII interface 222 of the network port 204. The received PC data may then be communicated to the MAC 206 and, via connection 232, to the switch control block 202. The switch control block 202 may route the received PC data to the PC port 208 for communicating the PC data off-chip to a PC. Received PC data may be prioritized and high priority data may buffered by the high priority buffer 246 and low priority data may be buffered by the low priority buffer 248. The multiport Ethernet switch 200 may then route the PC data off-chip for processing by a PC. In this regard, the PC data may be converted into signals suitable for transmission over an Ethernet cable medium using the internal 10/100Base Ethernet PHY 250 or a gigabit Ethernet PHY, not illustrated in FIG. 2, coupled to the RGMII interface 252. A gigabit Ethernet PHY may be located, for example, off-chip. The 10/100Base PHY 250 or the gigabit PHY may then transmit the PC data via an Ethernet network to a PC for further processing.

Figure 3:
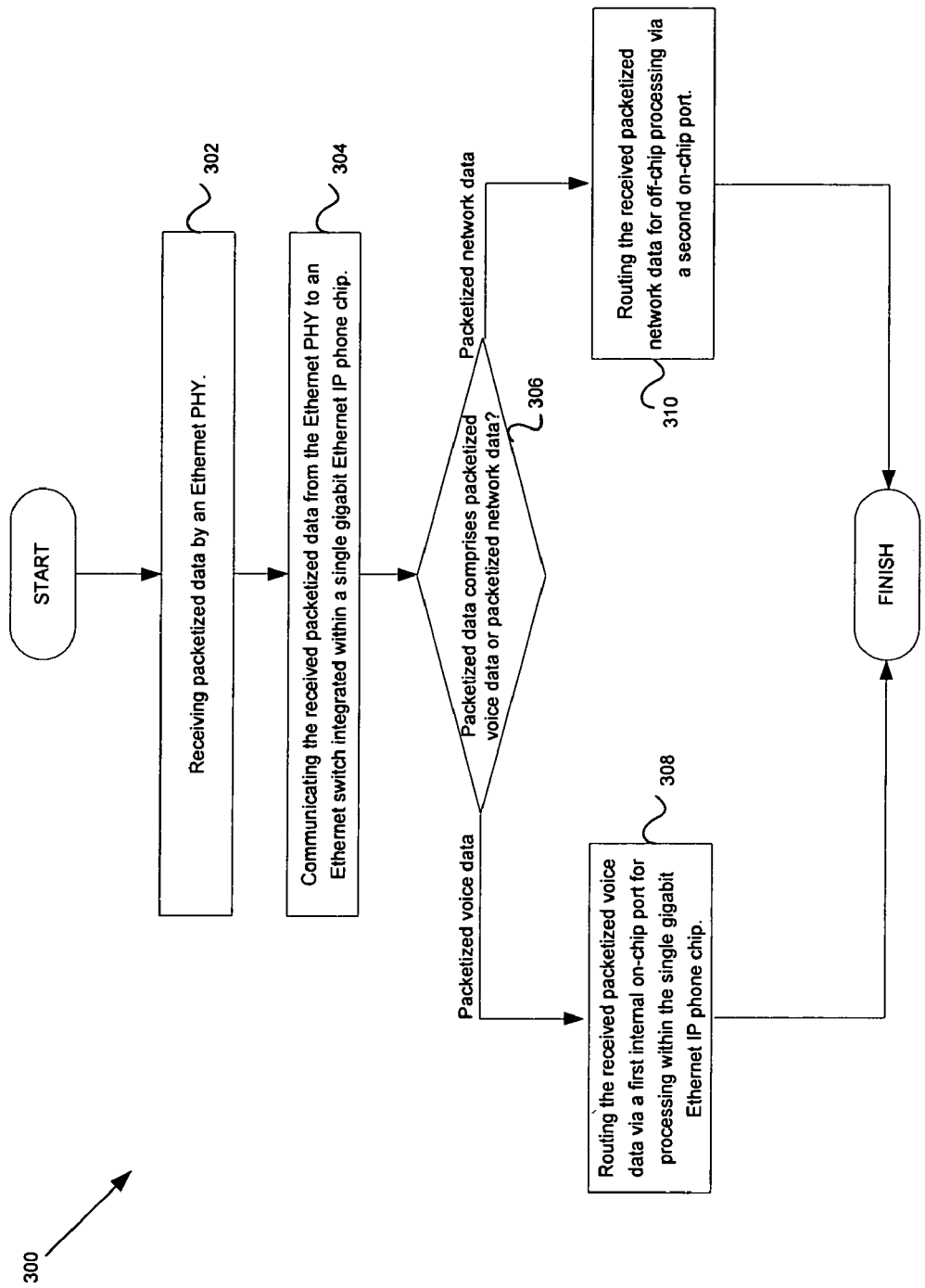
FIG. 3 is a flow diagram illustrating exemplary steps for processing Ethernet data, in accordance with an embodiment of the invention.

FIG. 3 is a flow diagram illustrating exemplary steps for processing Ethernet data, in accordance with an embodiment of the invention. Referring to FIG. 3, at 302, packetized data, such as PC or voice data may be received by an Ethernet PHY. At 304, the received packetized data may be communicated from the Ethernet PHY to an Ethernet switch integrated within a gigabit Ethernet IP telephone chip. At 306, it may be determined whether the packetized data comprises packetized voice data or packetized network, or PC, data. If the packetized data comprises packetized voice data, at 308, the received packetized voice data may be routed via a first on-chip port for processing within the gigabit Ethernet IP telephone chip. If the packetized data comprises network data, at 310, the received packetized voice data may be routed via a second on-chip port for off-chip processing.

Figure 4:
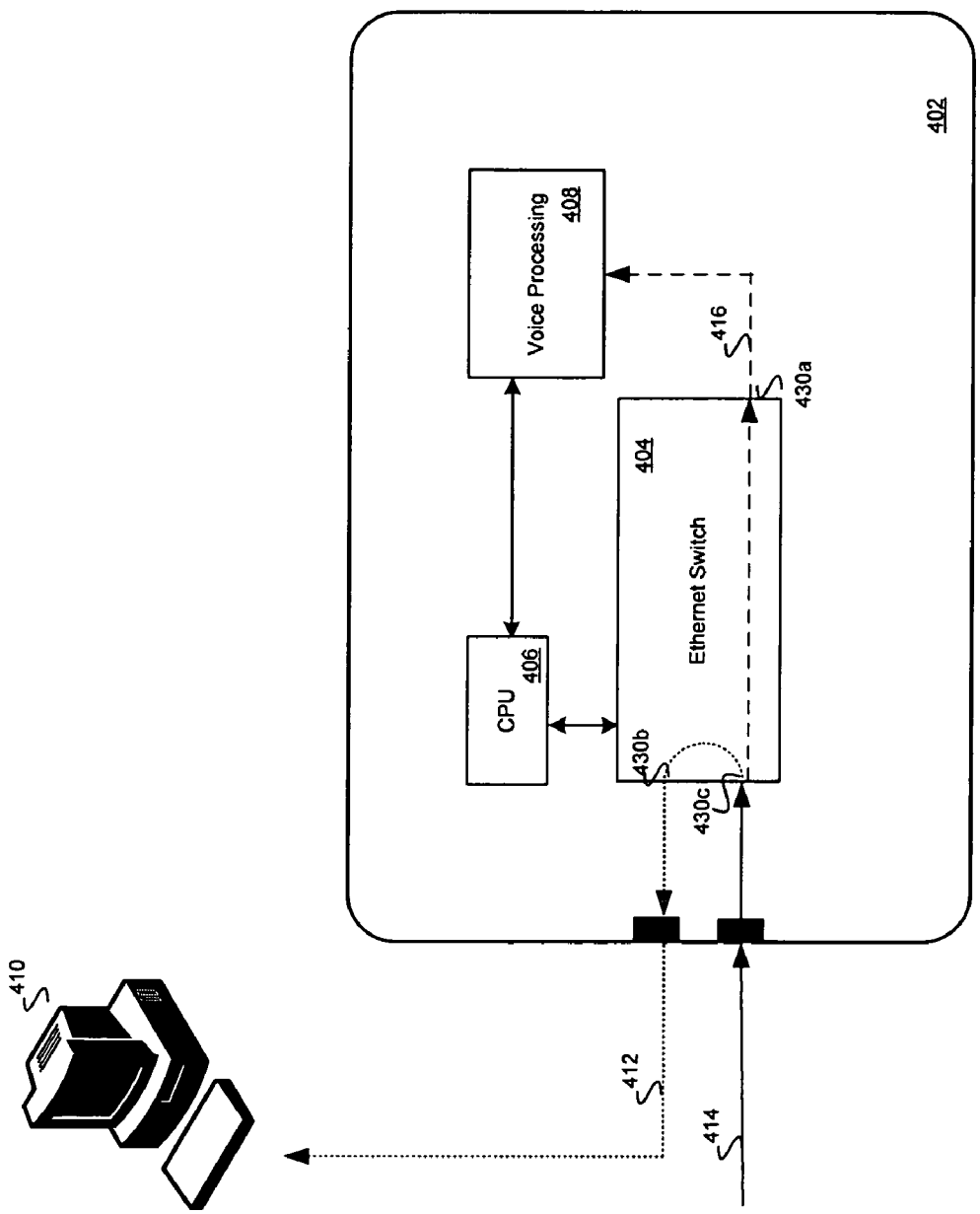
FIG. 4 is a block diagram of an exemplary system for a gigabit Ethernet IP telephone chip having an integrated Ethernet switch for switching, for example, received voice and network data, in accordance with an embodiment of the invention.

FIG. 4 is a block diagram of an exemplary system for a gigabit Ethernet IP telephone chip having an integrated Ethernet switch for switching, for example, received voice and network data, in accordance with an embodiment of the invention. Referring to FIG. 4, the gigabit Ethernet IP telephone chip 402 may comprise an Ethernet switch 404, a CPU 406, and voice processing block 408. The Ethernet switch 404 may be adapted to receive packetized data 414 via port 430*c* within the single gigabit Ethernet IP phone chip 402. The Ethernet switch 404 may then switch one or more portions of the received packetized data 414 between a first on-chip port 430*a* that routes data internally for processing within the single gigabit Ethernet IP phone chip 402, and a second on-chip port 430*b* that routes data externally for off-chip processing.

In one aspect of the invention, the packetized data 414 may comprise voice data 416 and PC data 412. The Ethernet switch 404 may communicate the voice data 416 via the port 430*a* to the voice processing block 408 for further processing. Similarly, the PC data 412 may be switched via port 430*b* and may be communicated to the PC 410 for processing.

The Ethernet switch 404 may comprise a 10/100 Base Ethernet physical interface transceiver (PHY). The gigabit Ethernet IP telephone chip 402 may comprise a gigabit Ethernet PHY that receives the packetized data 414. The gigabit Ethernet PHY may facilitate communication of the received packetized data 414 to the Ethernet switch 404 integrated within the single gigabit Ethernet IP phone chip 402 for switching.

Figure 5:
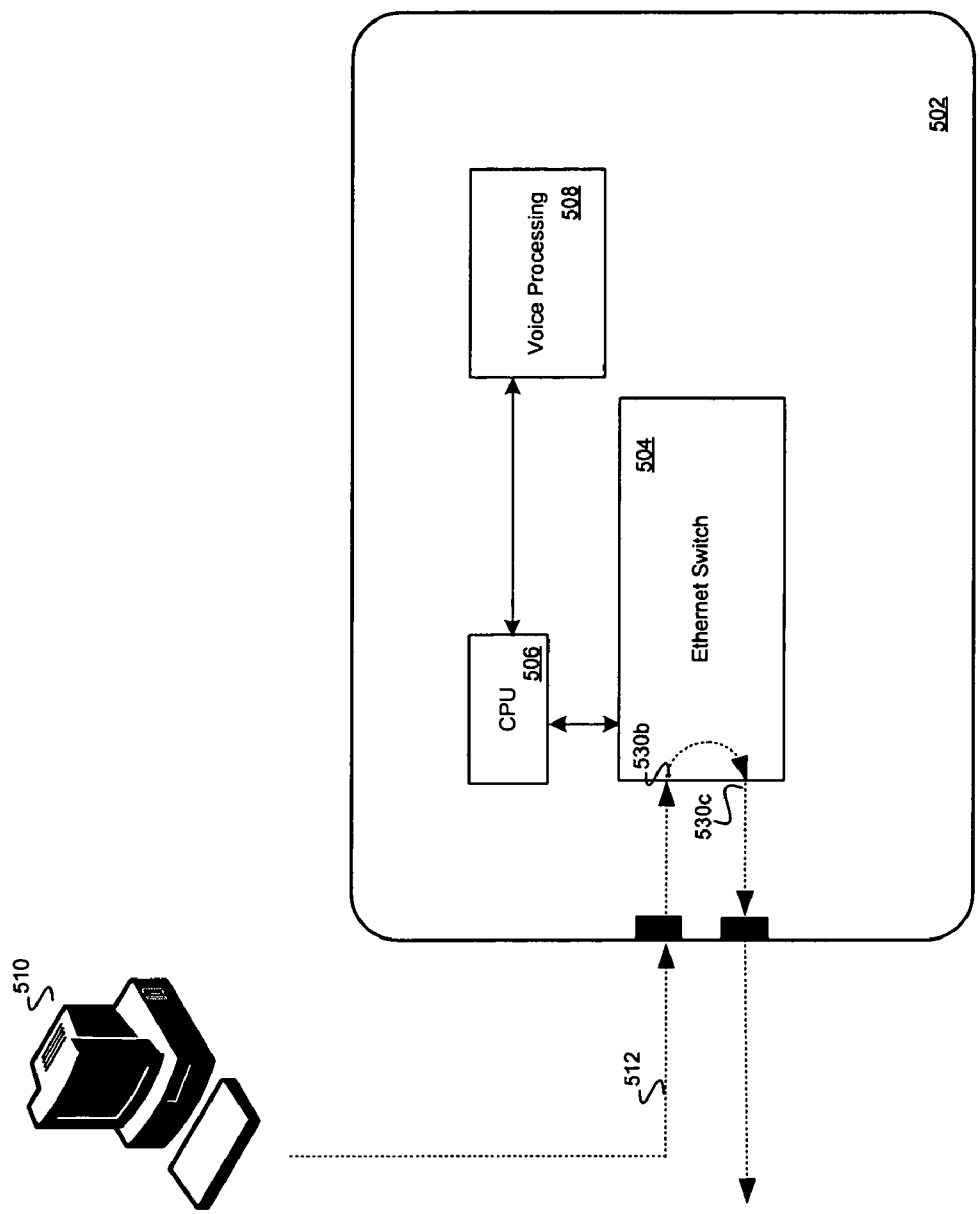
FIG. 5 is a block diagram of an exemplary system for a gigabit Ethernet IP telephone chip having an integrated Ethernet switch for switching, for example, outgoing network data, in accordance with an embodiment of the invention.

FIG. 5 is a block diagram of an exemplary system for a gigabit Ethernet IP telephone chip having an integrated Ethernet switch for switching, for example, outgoing network data, in accordance with an embodiment of the invention. Referring to FIG. 5, the gigabit Ethernet IP telephone chip 502 may comprise an Ethernet switch 504, a CPU 506, and voice processing block 508. The Ethernet switch 504 may be adapted to receive PC data 512 via port 530*b* within the single gigabit Ethernet IP phone chip 502. The Ethernet switch 504 may then switch one or more portions of the received PC data 512 between a first port 530*b* and a second port 530*c* that routes data externally for off-chip processing. In one aspect of the invention, PC data may be communicated from the PC 510 to the gigabit Ethernet IP telephone chip 502 for switching. The PC data may be received by the Ethernet switch 504 via port 530*b*. The Ethernet switch may then route the PC data off-chip via port 530*c*.

Figure 6:
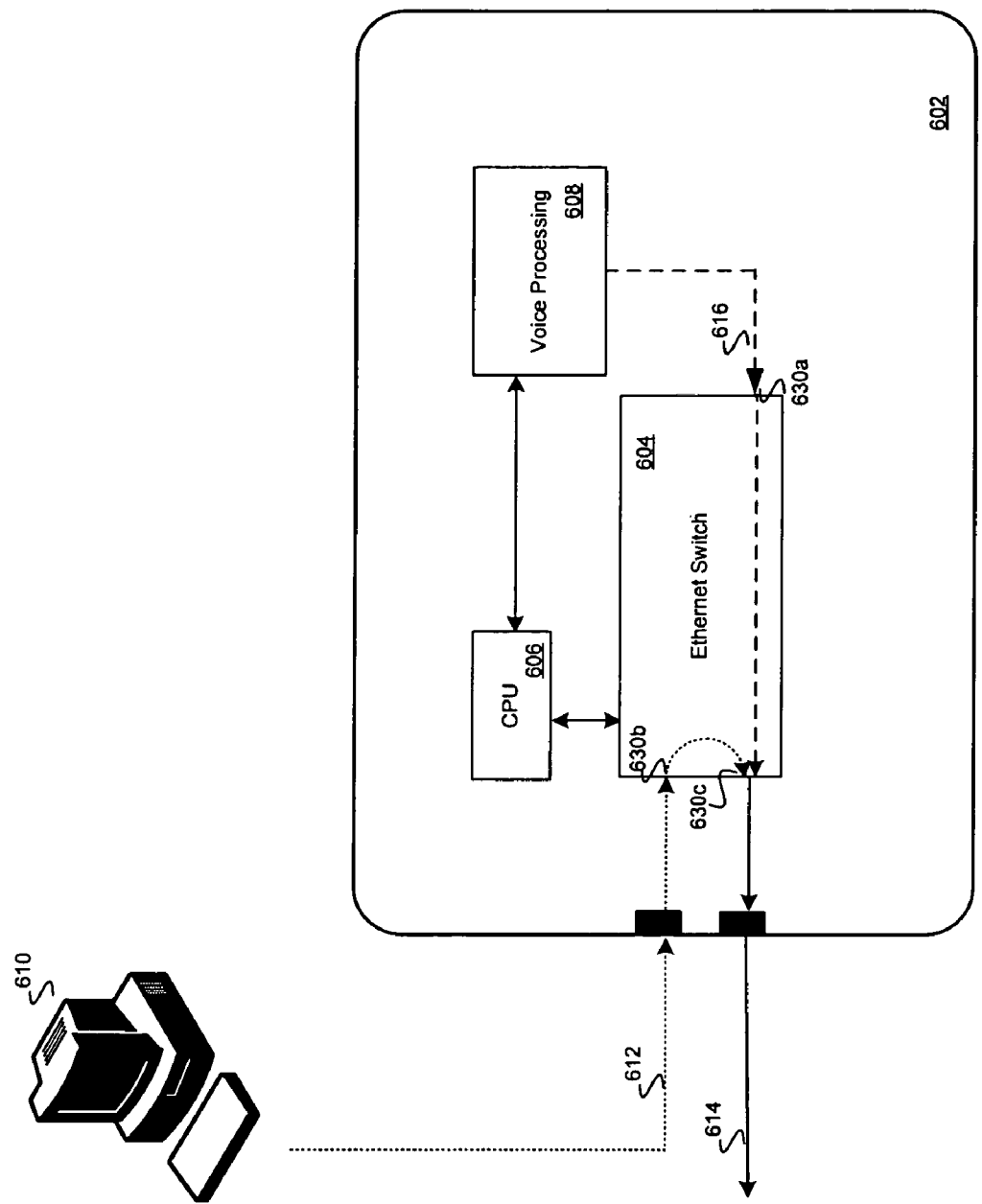
FIG. 6 is a block diagram of an exemplary system for a gigabit Ethernet IP telephone chip having an integrated Ethernet switch for switching, for example, outgoing voice and network data, in accordance with an embodiment of the invention.

FIG. 6 is a block diagram of an exemplary system for a gigabit Ethernet IP telephone chip having an integrated Ethernet switch for switching, for example, outgoing voice and network data, in accordance with an embodiment of the invention. Referring to FIG. 6, the gigabit Ethernet IP telephone chip 602 may comprise an Ethernet switch 604, a CPU 606, and voice processing block 608. The Ethernet switch 604 may be adapted to receive processed voice data 616 via internal port 630*a* within the single gigabit Ethernet IP phone chip 602. Voice data 616 may have been processed by the voice processing block 608 and the CPU 606. The Ethernet switch 604 may also receive PC data 612 from the PC 610 via the PC port 630*b*. The Ethernet switch 604 may then switch one or more portions of the received voice data 616 and the received PC data 612 and output packetized signal 614 via network port 630*c*. The packetized signal 614 may comprise voice data or PC data depending on priority processing characteristics of the received voice data 616 and the received PC data 612.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communication, the method comprising:
performing in a single gigabit Ethernet IP phone chip:
receiving packetized data by an Ethernet switch integrated within said single gigabit Ethernet IP phone chip, wherein said Ethernet switch comprises a first on-chip port that routes data internally for on-chip processing and a second on-chip port that routes data externally for off-chip processing:
communicating, via said first on-chip port of said Ethernet switch, portions of said received packetized data comprising video content to one or more peripheral interfaces integrated within said single gigabit Ethernet IP phone chip; and
communicating, via said one or more peripheral interfaces, said video content to a video processing device communicatively coupled to said gigabit Ethernet IP phone chip;
routing said received packetized data comprising said video content via said second on-chip port; and
routing said received packetized data comprising said video content to a gigabit Ethernet PHY.

2. The method according to claim 1, comprising receiving said packetized data by a 10/100BASE Ethernet physical interface transceiver (PHY) integrated within said single gigabit Ethernet IP phone chip.

3. The method according to claim 1, comprising receiving said packetized data via a gigabit Ethernet physical interface transceiver (PHY), wherein said gigabit Ethernet PHY is external to said single gigabit Ethernet IP phone chip.

4. The method according to claim 3, wherein said received packetized data is communicated from said gigabit Ethernet PHY to said Ethernet switch integrated within said single gigabit Ethernet IP phone chip for switching.

5. The method according to claim 1, wherein a remaining portion of said received packetized data comprises at least one of: packetized voice data and packetized network data.

6. The method according to claim 5, comprising communicating one or both of said voice data and said network data internally, via said first on-chip port, for processing within said single gigabit Ethernet IP phone chip.

7. The method according to claim 5, comprising communicating said voice data via said first on-chip port, and communicating said network data via said second on-chip port.

8. The method according to claim 5, comprising communicating one or both of said voice data and said network data via said second on-chip port.

9. A system for processing Ethernet data, the system comprising:
a single gigabit Ethernet IP phone chip that comprises an Ethernet switch, wherein:
said Ethernet switch comprises a first on-chip port that routes data internally for on-chip processing and a second on-chip port that routes data externally for off-chip processing;
said Ethernet switch is operable to receive packetized data and communicate, via said first on-chip port, portions of said received packetized data comprising video, content to one or more peripheral interfaces integrated within said single gigabit Ethernet IP phone chip;
said Ethernet IP phone chip is operable to communicate, via one or more interfaces integrated within said single gigabit Ethernet IP phone chip, said video content to a video processing device communicatively coupled to said gigabit Ethernet IP phone chip;
said Ethernet switch is operable to route said received packetized data comprising said video content via said second on-chip port; and
said Ethernet switch is route said received packetized data comprising said video content to a gigabit Ethernet PHY.

10. The system according to claim 9, comprising a 10/100Base Ethernet physical interface transceiver (PHY) integrated within said single gigabit Ethernet IP phone chip that receives said packetized data.

11. The system according to claim 9, comprising a gigabit Ethernet PHY that is external to said single Ethernet IP phone chip that receives said packetized data.

12. The system according to claim 11, wherein said gigabit Ethernet PHY communicates said received packetized data to said Ethernet switch integrated within said single gigabit Ethernet IP phone chip for switching.

13. The system according to claim 9, wherein a remaining portion of said received packetized data comprises at least one of: packetized voice data and packetized network data.

14. The system according to claim 13, wherein said Ethernet switch communicates one or both of said voice data and said network data internally, via said first on-chip port, for processing within said single gigabit Ethernet IP phone chip.

15. The system according to claim 13, wherein said Ethernet switch communicates said voice data via said first on-chip port, and communicates said network data via said second on-chip port.

16. The system according to claim 13, wherein said Ethernet switch communicates one or both of said voice data and said video data via said second on-chip port.

17. A system for communication, the system comprising:
one or more circuits for use in a single gigabit Ethernet IP phone chip, said one or more circuits comprising:
an Ethernet switch that comprises a first on-chip port that routes data internally for on-chip processing and a second on-chip port that routes data externally for off-chip processing; and
one or more peripheral interfaces;
wherein said one or more circuits are operable to:
receive packetized data;
communicate, via said first on-chip port of said Ethernet switch, portions of said received packetized data comprising video content to said one or more peripheral interfaces;
communicate, via said one or more peripheral interfaces, said video content to a video processing device communicatively coupled to said gigabit Ethernet IP phone chip;
route said received packetized data comprising said video content via said second on-chip port; and
route said received packetized data comprising said video content to a gigabit Ethernet PHY.

18. The system according to claim 17, wherein said one or more circuits are operable to receive said packetized data via a 10/100Base Ethernet physical interface transceiver (PHY) integrated within said single gigabit Ethernet IP phone chip.

19. The system according to claim 17, wherein said one or more circuits are operable to receive said packetized data via a gigabit Ethernet PHY that is external to said single gigabit Ethernet IP phone chip.

20. The system according to claim 19, wherein said received packetized data is communicated from said gigabit Ethernet PHY to said Ethernet switch integrated within said single gigabit Ethernet IP phone chip for switching.

21. The system according to claim 17, wherein a remaining portion of said received packetized data comprises at least one of: packetized voice data and packetized network data.

22. The system according to claim 21, wherein said one or more circuits are operable to communicate one or both of said voice data and said network data internally, for processing within said single gigabit Ethernet IP phone chip.

23. The system according to claim 21, wherein said one or more circuits are operable to communicate said voice data via said first on-chip port, and communicate said network data via said second on-chip port.

24. The system according to claim 21, wherein said one or more circuits are operable to communicate one or both of said voice data and said network data via said second on-chip port.

* * * * *